H. B. HARTMAN.
FLOW RESPONSIVE MOTOR.
APPLICATION FILED NOV. 8, 1915.
1,180,146.
Patented Apr. 18, 1916.
2 SHEETS—SHEET 2.
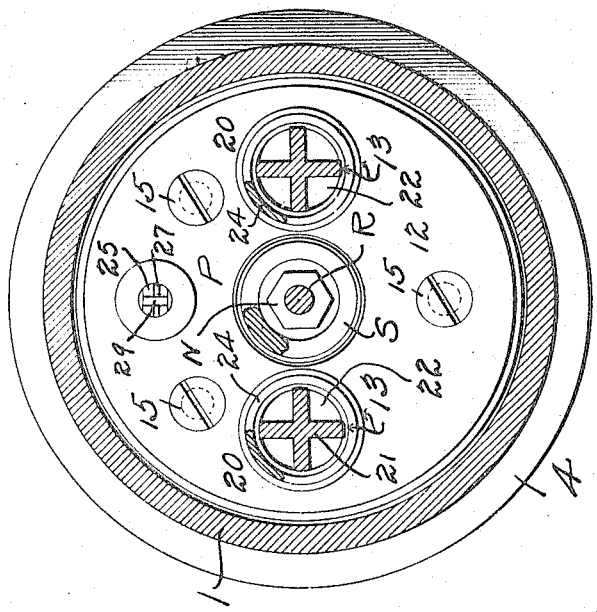
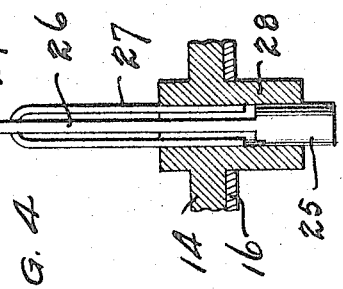
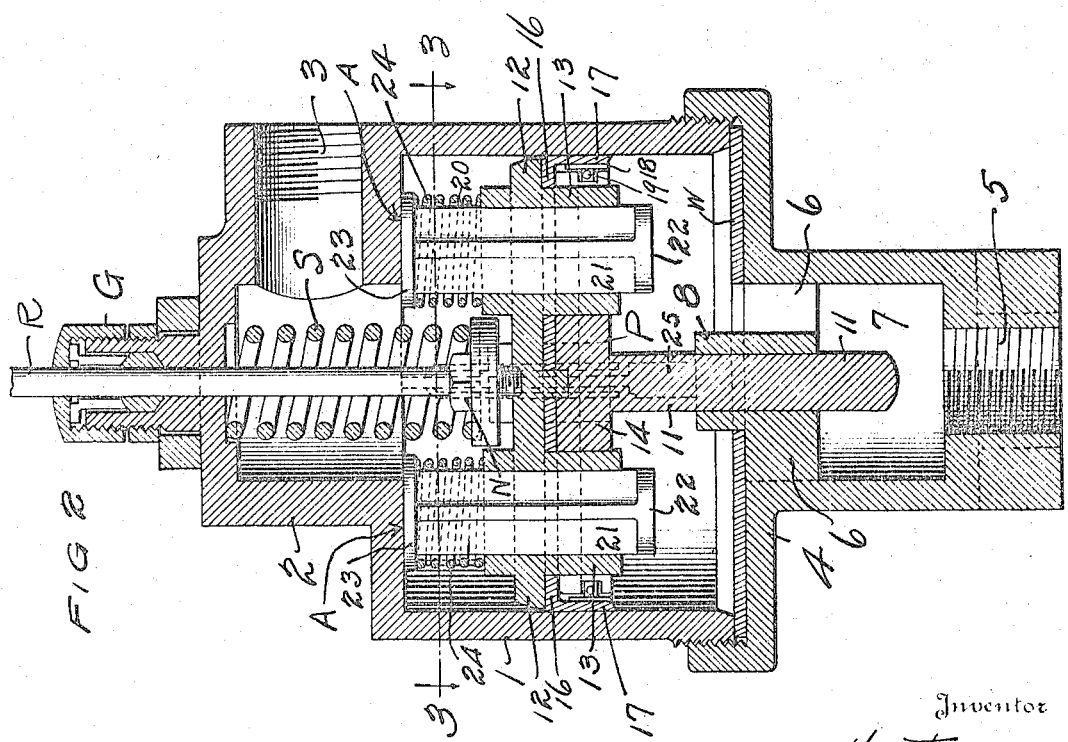
Inventor
Harry B. Hartman

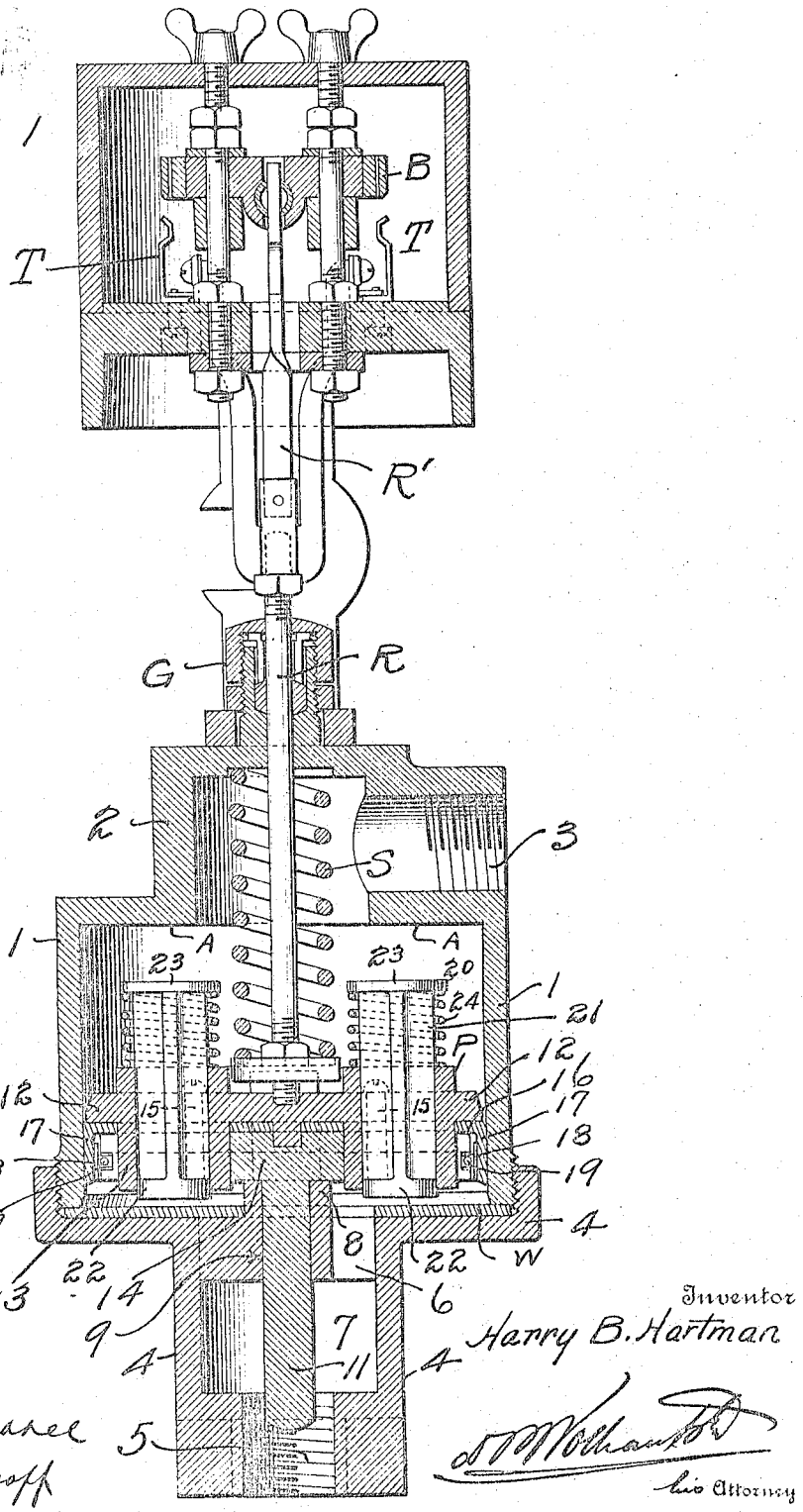

UNITED STATES PATENT OFFICE.

HARRY BUXTON HARTMAN, OF SCOTTDALE, PENNSYLVANIA, ASSIGNOR TO ELECTRIC WATER STERILIZER COMPANY, OF SCOTTDALE, PENNSYLVANIA, A CORPORATION OF PENNSYLVANIA.

FLOW-RESPONSIVE MOTOR.

1,180,146.  Specification of Letters Patent.  Patented Apr. 18, 1916.

Application filed November 8, 1915. Serial No. 60,344.

*To all whom it may concern:*

Be it known that I, HARRY B. HARTMAN, a citizen of the United States, residing at Scottdale, in the county of Westmoreland and State of Pennsylvania, have invented certain new and useful Improvements in Flow-Responsive Motors, of which the following is a specification.

This invention relates in general to fluid actuated motors, and more particularly to a device of this character that is of special utility in connection with electric water-purifying apparatus.

Water purifying apparatus of the type wherein an electrical current is used to purify the water, and with which the present invention is primarily intended to be used, usually includes an electrode box, a coagulation chamber, and suitable filter cylinders. That is to say, the water flows through the electrode box and is treated by the electric current while passing therethrough, then flows to the coagulation chamber, and then to the filter beds in the filter cylinders. The final purification is done by mechanical filtration through the filter beds. Thus, the water is purified automatically and continuously while the water is flowing, by a continuous and instantaneous process.

In connection with an apparatus of this kind, the present invention proposes to interpose an automatically operating flow responsive motor in the line of connection between the purified water cylinders and faucets to other draw-off valves whereby, when the latter are opened to draw off the pure water, the motor is actuated by the drop in pressure in the draw-off pipe line, to operate an electric switch and thereby close an electric circuit to set up the electrolytic action in the electrode box and thus supply treated water to the filter cylinders to replace that being drawn off.

To this end, the invention contemplates a novel and practical flow-responsive motor that may be relied upon to automatically operate when sterilized water is being drawn off from the system to operate a switch, such for instance as the type shown in my co-pending application Serial No. 60,345 filed November 8, 1915, and close an electric circuit which sets up the electrolytic action in the electrode box where raw water is being received from the service pipe or main before being conducted to the filter cylinders.

Another object of the present invention is to provide a simple and reliable construction involving but few working parts, and to also provide a device which will permit of being readily taken apart to facilitate adjustments, repairs or cleaning when the same are necessary, although in this connection, it will hereinafter more fully appear that the motor may be readily washed or cleaned without dismantling in a quick and effective manner.

With the above and other objects in view which will more readily appear as the nature of the invention is better understood, the same consists in the novel construction, combination and arrangement of parts hereinafter more fully described, illustrated and claimed.

A preferred and practical embodiment of the present invention is illustrated in the accompanying drawings, in which—

Figure 1 is a vertical sectional view of my improved flow responsive motor, showing the plunger thereof and the automatic flow controlling valves in their normal closed position, and also showing an operating connection between the plunger and an electrical switch device. Fig. 2 is an enlarged detail vertical sectional view of the motor with the plunger in its raised position, that is, the position which it occupies when water is being drawn from the apparatus, and showing the automatic flow controlling valves open. Fig. 3 is a cross sectional view on the line 3—3 of Fig. 2. Fig. 4 is a detail sectional view of the by-pass valve carried by the plunger for establishing the equilibrium of pressures on both sides of the plunger.

Similar reference characters designate corresponding parts throughout the several figures of the drawings.

The present invention primarily contemplates certain novel and practical improvements in the plunger member of a hydraulic motor to perform functions which are particularly useful in an electrolytic water purifying apparatus, and therefore a distinct feature of the construction is a motor construction which is specially applicable to, and use in connection with, an automatic snap switch for making and breaking the electrical circuit of the apparatus.

Referring particularly to the structural features of the motor, the same includes in its organization a casing designated generally by the reference letter C, and essentially comprising a plunger cylinder 1 having a contracted spring housing 2 at one end thereof which is provided with a laterally extending outlet or discharge connection 3, while the opposite end is provided with suitable external threads for detachably receiving the internally threaded flanged portion of a motor base member or closure cap 4. This base member 4 is provided with an inlet connection having an intake opening 5 for receiving filtered water from a storage source (not shown), and is also provided with a spider 6 spaced from the inlet 5 to provide an inlet chamber 7. As will be observed from Figs. 1 and 2, this spider 6 preferably has formed therewith a centrally located upstanding boss 8 having a stem guide opening 9 for slidably receiving and guiding the plunger stem 11 of the plunger designated in its entirety by the reference P. In connection with the fitting of the motor base member 4 to the end of the cylinder 1, it will be apparent that a suitable packing washer $w$ may be utilized to insure a water tight joint at this point.

The plunger device P above referred to is slidably arranged within the cylinder 1 of the casing, and is operated by the drop in pressure on the outlet side thereof. The same essentially includes in its organization a valve plate 12 which is preferably a casting formed with the hollow valve guide sleeves 13 extending in opposite directions on both sides of the body of the plate, and a body plate or disk 14 carrying the plunger stem 11. The said plates 12 and 14 are held together by means of suitable screws or other fastening elements 15 and clamp therebetween a suitable leather cup-washer 16, the outer edge 17 of which slidably contacts with the inner wall of the cylinder 1. To facilitate maintaining the engagement of the edge 17 of the washer with the cylinder wall, the same is provided with a suitable spring clamping band 18 and a spring wire 19 secured in the peripheral edges of the stem plate and exerting an outwardly yielding pressure on the inside face of the washer. Accordingly, it will be apparent that the entire piston element P is capable of a free movement in the cylinder 1, and is guided therein by the plunger stem 11 sliding in the guide 9 of the spider 6 which keeps the body of the piston from tilting or binding against the sides of the cylinder.

In order to provide a solid piston face, for the water pressure entering the cylinder 1 through the spider 6 to lift the plunger, the lower ends of the valve guides 13 must be closed. This is provided for by the automatically acting flow controlling valves 20, each of which comprises a winged stem 21, and a valve head 22 which closes the inlet port end of the valve guide sleeve. The end of the stem 21 opposite the valve head 22 is provided with a disk-like contact head 23 which extends beyond the lines of the stem 21 to provide a flange which constitutes an abutment for a spring 24, the lower end of which rests against the upper edge of the guide sleeve 13. Although the inlet end of the guides 13 is closed by the valve head 22, the latter does not have any definite seat. The head 22 closes the inlet port by being drawn up into the guide by the spring 24, and thus it may be said that each valve has a sliding seat. Or in other words, it has no permanent seat and does not close at any definite point for seating.

As each of the valves 20 is spring supported, or in other words, are maintained in their normal closed position by means of the spring 24 exerting a lifting pressure on the flange of the contact head 23, they can only be opened by contact or pressure from the outlet side of the plunger. Accordingly, it will be apparent that when the plunger rises, due to the drop in pressure on the outlet side thereof, the contact heads 23 will strike against the abutment face A of the valve casing, and thus cause the valve heads 22 to uncover the lower intake port ends of the valve guides. The water may then flow from one side of the piston to the other owing to the open skeleton-like formation of the stem 21 of the valve, the open position of which is clearly shown in Fig. 2.

With further reference to the features of the plunger P, it will be observed that the same has detachably connected to its central portion an operating connection or rod R, the upper end of which extends to an exposed position outside of the casing through a suitable gland G. This rod R is adjustably connected with a switch operating member R' which is adapted to control a switch block B for closing the circuit between the terminal contacts T of the circuit wires which lead to the electrode box not shown. The lower end of this member R carries therewith an adjusting nut member N which is adapted to abut with one end of a stout coil spring S, the other end of which fits into a depression or spring socket in the head of the spring housing. Accordingly, it will be clear that the spring S is so arranged that it exerts a downward pressure on the plunger P, which tends to hold the same at the bottom of the plunger chamber, and in contact with the centrally arranged boss 8 of the inlet spider 6. The said plunger is also provided with a by-pass valve 25 which includes a guide stem or shank portion 26 which is of such a length that it will strike the face A ahead of the tops 23 of the valves 20, and a friction spring 27, the free ends of which slide within the sleeve 28 of the valve plate 14. The construction of this valve is such, that in the normal at-rest position of the plunger, the valve head 25 having flat faces on each side to let a slight amount of water pass either way through the plunger, fits in the open end of the sleeve 28 thus practically closing the same. However, when the plunger rises, as shown in Fig. 2, the upper end 29 of the stem 26 strikes against the abutment face A of the casing and pushes the valve head 25 out of the end of the sleeve 28 to thus establish communication between both sides of the plunger prior to the opening of the valves 20. This position of the by-pass valve is shown in dotted lines in Fig. 2, and in connection therewith, it will be understood that this by-pass valve remains open as long as the plunger is lifted or raised as shown in Fig. 2, and also for a sufficient length of time after the draw-off connection has been closed to permit the plunger to quickly return to its normal position and the pressures on both sides of the valve to become equal. This by-pass valve has its stem so disposed that it opens said valve on the instant that the electric circuit is closed and just a fraction of a second ahead of the opening of the valves 20, and is also adjusted so that it closes after the valves 20 by striking the bottom of the casing. Thus, this by-pass valve speeds up the opening and closing of the valve ports and makes the motor operate as nearly instantaneous as possible to thus quickly close the electric switch when water is being drawn from the system, and also insure the quick return of the plunger and prevent any possibility of the electrical contact staying in circuit after the water has ceased to flow. In other words, it is so arranged that the electric circuit is broken simultaneously with the discontinuation of the flow of the water through the motor. Sometimes a draw-off valve may be opened just to draw three or four spoonfuls of water. This is not sufficient to open the valves 20 in the plunger "P", but is just sufficient to open the by-pass 25, and this allows plunger "P" to return quickly to its original position without any delayed motion or dragging.

With further reference to the valve 25 it may be noted that when the valve or faucet in the draw-off line is closed, the spring S will exert its influence to push the plunger to the lower part of the cylinder, and thus cause the heads 22 of the valves 20 to close the valve ports in the sleeves 13 of the plunger. Up to a certain point the pressures will be equalized through the valves 20 before they can close. However, after the contact heads 23 of the valves 20 leave the abutment face A of the casing, thus permitting the springs 24 to exert their full influence, and close the ports at the ends of the valve guide sleeves 13, the valve 25 still remains open to continue the complete equalization of pressures. As there is less play between the heads 22 of the valves 20 and the ports at the ends of the guide sleeves 13, than there is between the bottom of the valve head 25 and the top of the base member 4, it will be clear that the valves 20 will become closed before the valve 25, and thus the pressures will be substantially equalized on both sides of the piston through the hollow sleeve 28 and by-pass valve 25. After the pressure on the outlet side of the plunger is substantially equal to that on the inlet side, and the top of the valve 25 registers with the lower end of the opening in the sleeve 28, the spring S will exert sufficient pressure to force and hold the piston P down onto the top of the boss 8 of the base member. These operations however, occur very quickly so that for practical purposes the opening and closing of the valve devices of the motor are simultaneous with the opening and closing of the faucet of the draw-off connection.

By reference to the manner of operation of the present motor, it is believed that it will be clear from Figs. 1 and 2, that the normal position of the plunger is at the bottom of the plunger chamber of the casing, on top of the upstanding boss 8, so that there is an open space between the bottom of the plunger and top of the base member 4 in communication with the inlet chamber 7. When pressure is reduced in the plunger chamber on the outlet side of the plunger, by the opening of the faucet in the draw-off line, the pressure of the water on the inlet side of the piston will force the entire plunger upwardly until the contact heads 23 of the valves 20 abut against the face A of the casing. The initial contact of the heads 23 with the face A uncovers the intake end of the valve guides 13, that is, it unseats the valve heads 22, and the continued upward movement of the plunger only further opens the valves so that water from the inlet chamber 6 may freely pass through the casing by way of the skeleton-like shanks of the valves, to make its way out into the draw-off pipe line through the discharge outlet 3. As has been previously mentioned, when the plunger reaches its limit of upward movement, the by-pass valve 25 is also opened, thus permitting water to also flow therethrough. When the flow is stopped by closing a valve in the draw-off pipe line, the spring S exerts its influence to push the plunger back to its normal position, thus closing the valves 20 in advance of the by-pass valve 25, so that the pressure equilibrium is established through the latter, and the entire plunger finally driven to its place on the top of the boss 8 by the pressure of the spring S.

Another novel and important feature of the invention resides in the spacing of the entire plunger from the bottom of the plunger cylinder in the present case, the top of the base member 4. As apparent from the foregoing description, the upstanding boss 8 provides for this spacing of the plunger from the valve bottom 4, and not only provides room for the water pressure to exert its full effect on the entire under face of the plunger, but permits of a substantial reversal of flow for cleaning out purposes, when the latter is necessary. That is to say, if the water pressure should be supplied to the casing through the discharge outlet 3 while the plunger is in its normal at-rest position as shown in Fig. 1, the valve heads 22 will be unseated so that water can flow from the outlet side of the plunger to the inlet side thereof and thus through the inlet opening 5. In other words, if the water is supplied through the discharge outlet, it will pass from the outlet side of the plunger through the valve supporting springs 24 into the valve guides 13, because of the skeleton-like body of the valve, and thus unseat the head 22 of the valve, and in this way traverse the normal flow through the apparatus.

From the foregoing description, it is thought that the many features and advantages of the present invention will be readily apparent, and it will also be understood that changes in the form, proportion and minor details of construction may be resorted to without departing from the spirit of the invention or scope of the appended claims.

I claim:

1. A flow responsive motor comprising a casing having inlet and outlet connections, a spring pressed plunger arranged within the casing and carrying therewith normally inoperative automatic flow controlling valves adapted to be automatically opened by contact with the casing on the outlet side of the plunger, and a separate mechanically operated by-pass device carried by said plunger.

2. A flow responsive motor comprising a casing having inlet and outlet connections, a ported plunger carrying spring seated valves adapted to be opened by a contact with the casing, spring means for holding the valved plunger in its normal inoperative position, and a separate mechanically operated by-pass valve device carried by said plunger and opening in advance of said spring seated valves.

3. A flow responsive motor comprising a casing having inlet and outlet connections, a spring pressed plunger arranged within the casing and spaced above the bottom thereof, said plunger carrying therewith normally closed automatic flow controlling valves adapted to be opened by pressure upon the portion thereof on the outlet side of the plunger, and a separate mechanically operated by-pass valve device closing after the said flow controlling valves are closed.

4. A flow responsive motor comprising a casing having inlet and outlet connections, and a spring pressed plunger arranged within the casing and carrying therewith normally closed automatic flow controlling valves adapted to be automatically opened by pressure on a portion thereof on the outlet side of the plunger, and a separate mechanically operated by-pass valve for establishing an equalization of pressure on both sides of the plunger after the automatic valves have been closed.

5. A flow responsive motor comprising a casing having inlet and outlet connections, a plunger operable within the casing and having a stem guided therein, automatic flow controlling valves carried by said plunger, a separate normally closed by-pass valve also carried by said plunger and operated by contact with opposite ends of the casing, an operating connection having one end extending to an exposed position outside of the casing and the other end connected to said plunger, and a spring mounted on said operating connection for holding the plunger in its normal position.

6. A flow responsive motor comprising a casing having inlet and outlet connections, and a spring pressed plunger including a valve plate and a stem plate having clamped therebetween a cup washer, and means for holding the edge of said washer in contact with the sides of the casing, automatic flow controlling valves carried by said plunger, and a separate mechanically operated by-pass valve for establishing pressure equilibrium on both sides of the plunger when the flow controlling valves are closed.

7. A flow responsive motor comprising a casing having inlet and outlet connections, and a spring pressed plunger including a valve plate having vertically disposed valve guides, a stem plate fastened to said valve plate and clamping thereto a cup washer, and means for holding the edge of said cup washer in contact with the sides of the casing, spring supported flow controlling valves arranged to slide in said valve guides, and a separate mechanically operated by-pass valve.

8. A flow responsive motor comprising a casing having a plunger chamber, a spring pressed plunger operable in said chamber, an inlet connection at one side of the plunger, and an outlet connection at the other side of said plunger, automatic flow controlling valves normally closed to pressure at the inlet side of the plunger, said valves adapted to be opened by striking the casing when a pressure drop on the outlet side of the plunger causes the same to rise, and a separate mechanically operated by-pass valve opening in advance of said automatic valves and closing after the same are closed.

9. A flow responsive motor comprising a casing having a plunger chamber, a spring pressed plunger operable in said chamber, an inlet connection at one side of the plunger and an outlet connection at the other side, automatic flow controlling valves carried by said plunger and adapted to be opened by a pressure or contact on the outlet side of said plunger, and an independent mechanically operated by-pass valve having a stem for striking the casing to open the valve ahead of the automatic valves, and having its lower portion on the inlet side of the plunger arranged to strike the bottom of the casing upon the return of the plunger to normal position to thereby close the by-pass after the closing of the automatic valves.

10. A flow responsive motor comprising a casing providing a plunger chamber and having a contracted spring housing provided with a laterally disposed discharge outlet, a base member detachably fitted to the lower part of the casing and having an inlet connection and a plunger guiding inlet spider, a valved plunger adapted to operate in the plunger chamber and having a stem slidable in and guided by said spider, and a spring confined between one end of the spring housing and the plunger for maintaining the latter in its normal at-rest position.

11. A flow responsive motor including a casing having a plunger chamber and a contracted spring housing at one end of the chamber provided with a laterally disposed discharge outlet, a base member detachably fitted to the end of the casing opposite the spring housing and having an inlet connection and a plunger guiding spider including an upstanding boss, a valve plunger adapted to operate in the plunger chamber and having a stem slidable in and guided by the said spider, said plunger adapted to rest upon the boss of the spider and thereby be spaced from the base member, and a spring confined between one end of the spring housing and the plunger for holding the latter in its normal at-rest position.

In testimony whereof I hereunto affix my signature in the presence of two witnesses.

HARRY BUXTON HARTMAN.

Witnesses:
W. S. WILEY,
J. W. WILEY.